United States Patent Office 3,702,249
Patented Nov. 7, 1972

3,702,249
PHOTOGRAPHIC ELEMENT COMPRISING AMINE-CONTAINING POLYMERS
Wayne A. Bowman, Rochester, N.Y., assignor to Eastman Kodak Company, Rochester, N.Y.
No Drawing. Filed Aug. 3, 1970, Ser. No. 60,709
Int. Cl. G03c 1/04
U.S. Cl. 96—84 R                       5 Claims

ABSTRACT OF THE DISCLOSURE

New addition homo- or copolymerizable ethylenically unsaturated monomers containing primary amino groups which do not enter into or interfere with the polymerization of the formula:

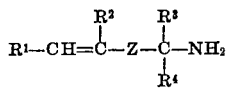

where $R^1$ is hydrogen or carboxyl; $R^2$ is hydrogen, methyl or ethyl; each of $R^3$ and $R^4$ is an alkyl group of 1 to 12 carbon atoms; and Z is a divalent group containing at least one

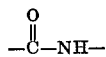

group and having the formula

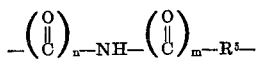

where each of $n$ and $m$ is 0 or 1, and $n$ is 0 when $m$ is 1 and $m$ is 0 when $n$ is 1, and $R^5$ is a divalent organic material selected from the group consisting of alkylene of 1 to 20 carbon atoms, azaoxoalkylene of 2 to 20 carbon atoms, cycloalkylene of 5 to 14 carbon atoms, and alkylenecarbamoylphenylene with the alkylene group containing 1 to 20 carbon atoms, and the acid addition salts thereof, are produced by reaction of an ethylenically unsaturated carboxylic anhydride or N-alkenyl dicarboximide with the corresponding diamine. The homo- and copolymers of these monomers are useful in photography.

---

This invention relates to novel addition polymerizable monomers containing primary amino groups and novel polymers produced therefrom. They are useful in photography. In one of its aspects this invention relates to the preparation of such monomers and polymers. In another of its aspects this invention relates to the employment of these polymers in photographic materials, elements and processes to obtain a desirable combination of properties.

Gelatin has good dispersion properties, excellent protective colloid properties and has been used as the binding agent in layers of photographic elements for many years. Gelatin, however, is subject to dimensional change when subjected to varying temperature, humidity and like conditions and its quality is not uniformly consistent due to variation in the natural sources from which it is obtained. To overcome these disadvantages, many natural and synthetic materials have been proposed as substitutes for gelatin in one or more layers of a photographic element.

Among the materials proposed have been vinyl or addition polymers (e.g., U.S. 3,062,674 and 3,142,568), acrylic polymers containing sulfoalkyl groups (e.g., U.S. 3,411,911), copolymers derived from acrylic monomers containing aldehyde-hardenable active methylene groups (e.g., U.S. 3,459,790 and 3,488,708) and addition polymers containing pendant primary amine groups (e.g., U.S. 3,392,025 and 3,415,653).

However, the preparation of addition polymers containing pendant primary amine groups has entailed a number of difficulties. The reactive character of the primary amino group precludes direct polymerization of ethylenically unsaturated, addition polymerizable monomers containing such groups. A number of polymers containing primary amino groups have been prepared by tedious, multistep procedures. For example, see U.S. Pats. 3,415,653; 3,449,126; Belgian Pat. 540,976; U.S. Pats. 2,276,322; 2,484,423; 3,211,685; 3,296,167; 3,308,081; 3,449,126 and British Pat. 1,002,231.

Accordingly, an object of this invention is to provide a novel class of amine-containing polymers that can be incorporated into photographic materials to obtain products exhibiting good physical and photographic properties.

Another object of this invention is to provide novel vinyl monomeric materials containing primary amino groups which can be homo- or copolymerized without the amine groups entering into or interfering with the addition polymerization to form polymers that can be incorporated into photographic materials exhibiting good dimensional stability, good adhesion and resistance to abrasion.

A further object of this invention is to provide a novel method for the preparation of vinyl monomers containing primary amino groups.

Still another object of this invention is to provide photographic elements and emulsions in which the binding agent comprises gelatin and a film-forming, addition homo- or copolymer containing primary amino groups.

Another object is to provide water-soluble synthetic polymeric systems useful in photography which exhibit a substantially increased rate of insolubilization by cross-linking agents in aqueous media.

Other objects of this invention will become apparent from an examination of the specification and claims which follow.

In accordance with this invention, there are provided novel ethylenically unsaturated, addition polymerizable monomers containing ω-primary amino groups and a novel method for preparing them. The novel monomers of this invention can be represented by the formula:

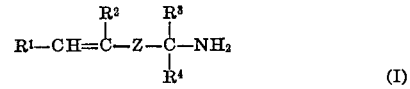

where $R^1$ is hydrogen or carboxyl; $R^2$ is hydrogen, methyl or ethyl; each of $R^3$ and $R^4$ is an alkyl group of 1 to 12 carbon atoms, preferably 2 to 5 carbon atoms, straight or branched chain, such as methyl, ethyl, isopropyl, butyl, pentyl, hexyl, 4-methylpentyl, heptyl, octyl, 2-ethylhexyl, decyl, lauryl, octadecyl, eicosyl and the like; and Z is a divalent group containing at least one

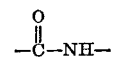

group and having the formula

where each of $n$ and $m$ is 0 or 1, and $n$ is 0 when $m$ is 1, and $m$ is 0 when $n$ is 1, and $R^5$ is a divalent organic hydrocarbon group selected from the group consisting of alkylene of from 1 to 20 carbon atoms, preferably 2 to 10 carbon atoms (such as methylene, ethylene, propylene, 1,3-trimethylene, octylene, tetramethylene, decylene, tetradecylene, octadecylene and eicosylene), azaoxoalkylene of 2 to 20 carbon atoms, preferably 2 to 10 carbon atoms (such as 2-aza-3-oxopentamethylene), cycloalkylene of 5 to 14 carbon atoms, preferably 5 to 10 carbon atoms (such as cyclopentylene, methylcyclopentylene, cyclohexylene, methylcyclohexylene, ethylcyclohexylene, butylcyclohexylene, cycloheptylene, methylcycloheptylene, propylcycloheptylene) and alkylenecarbamoylphenylene of the formula:

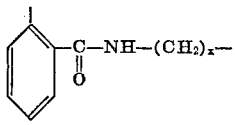

where $x$ is 1 to 20, preferably 2 to 10, such as methylenecarbamoylphenylene, propylenecarbamoylphenylene, pentamethylenecarbamoylphenylene, octamethylenecarbamoylphenylene, dodecamethylenecarbamoylphenylene, octadecamethylenecarbamoylphenylene, eicosamethylenecarbamoylphenylene and the like; and the acid addition salts thereof.

In a preferred embodiment the novel monomers of this invention can be homo- or copolymerized to novel polymers having primary amino groups appended thereto. These polymers are advantageously employed as binding agents in photographic materials to give products having good dimensional stability, good adhesion to film supports and improved resistance to abrasion.

In still another embodiment certain primary amino containing polymers of this invention are useful as coagulants for photographic silver halide suspensions peptized with sulfate or sulfonate-containing polymers.

In a further preferred embodiment, polymerizable ethylenically unsaturated sulfate and sulfoester compounds are copolymerized with the primary amino group-containing monomers of this invention to produce copolymers exhibiting good adhesion to film supports, improved resistance to abrasion and excellent salt tolerance, i.e., they do not coagulate in the presence of organic or inorganic salts which are often present in photographic silver halide compositions.

In still a further preferred embodiment the primary amino group-containing monomers of this invention are prepared in good yield and a high state of purity by a novel process.

In another embodiment certain water-soluble synthetic polymer compositions exhibit a substantially increased rate of insolubilization in aqueous media when treated with aldehydic crosslinking agents such as formaldehyde and glyoxal. Polymers of this type are prepared from monomeric units comprising primary amino group-containing monomers of this invention and ethylenically unsaturated monomers containing active methylene groups. An increased rate of insolubilization with aldehydic agents is also achieved with physical mixtures of homo- or copolymers of this invention that contain primary amino groups and polymers containing active methylene groups.

Prior art which is pertinent to this invention but is not believed to anticipate it or render it obvious are British Pats. 769,271 and 867,528; U.S. Pats. 2,845,408; 3,296,167; 3,308,081; 3,459,790 and 3,488,708; U.S. Ser. No. 754,731 and Kato and Yoshida, Chemical Abstracts 70: Abstract 11084b (page 219) (1969).

U.S. Pat. 2,845,408 cited above discloses the aminolysis of polymeric esters of $\alpha,\beta$-unsaturated monocarboxylic esters with certain hindered amines. This procedure, however, cannot be used to prepare the addition polymerizable, primary amino group-containing compounds of this invention by aminolysis of a monoethylenically unsaturated carboxylic ester with a hindered diamine, because the unhindered primary amino group adds preferentially to the

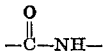

The addition polymerizable monomers of this invention are distinguished from the prior art in that they comprise a primary amino group linked through a divalent organic linking group containing at least one

group attached to a vinyl group which can or cannot be substituted. In addition, the carbon $\alpha$ to the primary amino group is disubstituted with groups tending to reduce or hinder the reactivity of the primary amino group either by steric hindrance or by reducing its nucleophilicity.

The improved process for preparing the novel monomers of this invention comprises reacting a non-aromatic, aliphatic $\alpha,\omega$-diamine in which one, and only one, of the primary amino groups is sterically hindered or made less nucleophilic by the attachment of substituents other than hydrogen to the carbon atom $\alpha$ to said primary amino group, with an ethylenically unsaturated carboxylic anhydride or an N-alkenyldicarboximide at a temperature between about 0° to about 45° C. These $\alpha,\omega$-diamines have the formula:

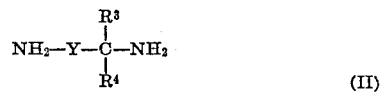

where Y is an alkylene group of 1 to 20 carbon atoms or cycloalkylene of 5 to 14 carbon atoms including lower alkyl substituted cycloalkylene; and each of $R^3$ and $R^4$ is an alkyl group of 1 to 12 carbon atoms, as defined above.

The process of this invention is illustrated by Equations 1, 2 and 3 below:

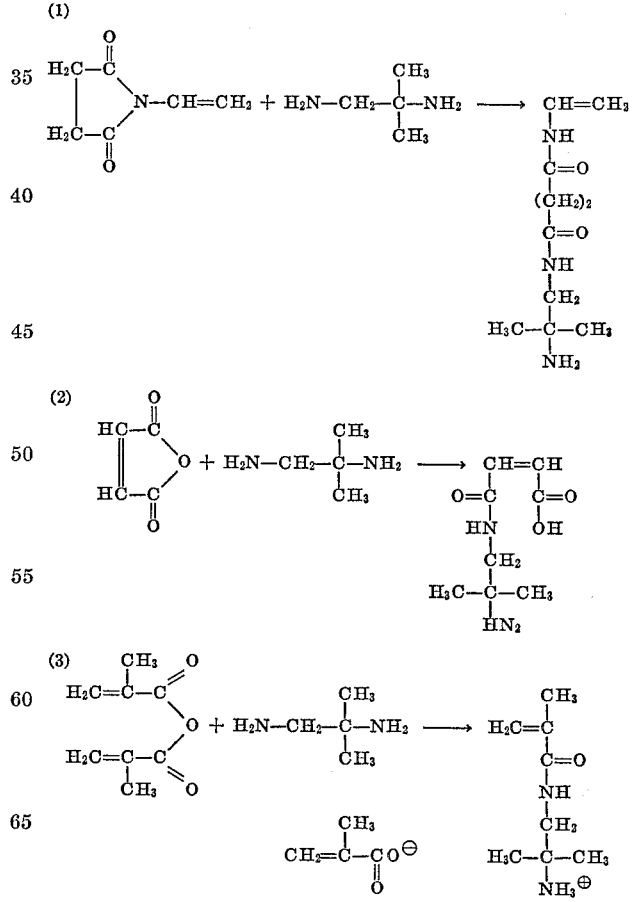

A significant feature of the process of this invention is that at least one $$-\underset{\underset{O}{\|}}{C}NH-$$

group is formed as a stable linking group joining the primary amino group and the ethylenically unsaturated portion of the polymerizable monomer. It is known (Organic Chemistry, Fieser and Fieser, page 242, third edition, 1956) that amides require more drastic hydrolysis conditions because they are much less reactive than esters.

Another significant feature of the process of this invention is that although substantially only the unhindered primary amino group of the diamine reactant will react with the carboxylic anhydride or dicarboximide reactant to form the novel monomers of this invention, it has been surprisingly found that in polymers produced from these monomers, the bulky hindering groups do not prevent the primary amino groups from advantageously reacting with conventional crosslinking agents, such as formaldehyde and glyoxal.

Exemplary of ethylenically unsaturated carboxylic anhydrides and N-alkenyldicarboximides that can be employed in the process of this invention are acrylic anhydride, methacrylic anhydride, crotonic anhydride, maleic anhydride, itaconic anhydride, N-vinylsuccinimide, N-vinylglutarimide, N-vinylphthalimide and the like.

Useful $\alpha,\omega$-diamines for the invention include:

1,2-diamino-2-methylpropane

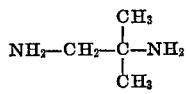

1,3-diamino-3-ethylpentane

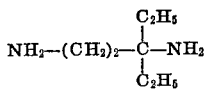

2-amino-2-ethyl-6-methylheptylamine

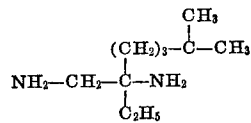

5-amino-5-n-butylnonylamine

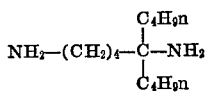

3-amino-3-propylundecylamine

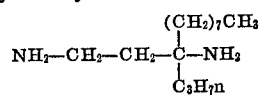

8-amino-8-propylundecylamine

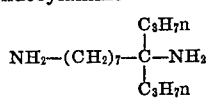

12-amino-12-methyltridecylamine

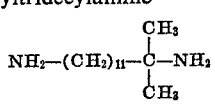

16-amino-16-ethyleicosylamine

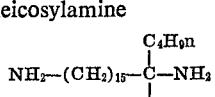

19-amino-19,24-dimethylhexacosamine

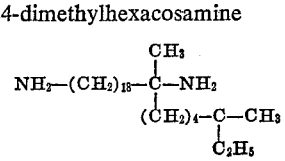

3-(2-aminoisopropyl)cyclopentylamine

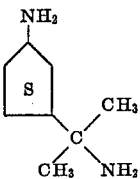

4-(1-amino-1-ethylpropyl)cyclohexylamine

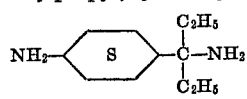

4-(2-aminoisopropyl)cycloheptylamine

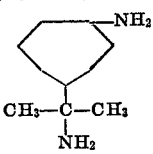

1,8-methanediamine

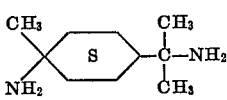

1-(1-amino-1-methylbutyl)-4-amino-4-n-butyl-cyclohexane

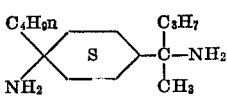

and the like.

An acid addition salt of the primary amino group containing monomers is formed when an ethylenically unsaturated open chain anhydride, for example, acrylic or methacrylic anhydride, is employed in the process of this invention. Such salts as well as their free bases are intended to be within the scope of this invention, particularly since they are useful in addition polymerization reactions, the acid addition salts generally providing polymers of higher molecular weight. The acid portion of the acid addition salt is produced in the reaction of open chain anhydride and hindered diamine. This acid is ethylenically unsaturated and polymerizable and functions, therefore, as a comonomer in polymerization reactions involving an acid addition salt of a primary amino group-containing monomer of this invention.

Typical examples of acid addition salts useful in the process of this invention include N-(2-amino-2-methylpropyl)methacrylamide methacrylic acid salt; N-[1-methyl-4-(1-amino-1-methylethyl)cyclohexyl]acrylamide, acrylic acid salt; N-[1-amino-4-(1-ethylpropyl)cyclohexyl]methacrylamide, methacrylic acid salt; N-(3-amino-3-ethylpentyl)acrylamide, acrylic acid salt; N-(8-amino-8-propylundecyl)acrylamide, acrylic acid salt; and the like.

The process of this invention can be carried out at atmospheric, super-atmospheric or subatmospheric pressure.

The temperature range and the time required to complete the reaction are subject to variation, depending, for example, upon the particular reactants employed, the stability of the product formed and like considerations. Generally, temperatures from about 0° C. to about 50° C., and preferably from about 18° C. to about 40° C., are suitable.

The time required for completion of the reaction ranges from about one hour to about 55 hours; preferably from about two to about 50 hours, depending on the temperature employed.

The reaction is carried out in a solvent or a mixture of solvents in which the reactants are soluble but the reaction product preferably is not soluble. Useful solvents include diethyl ether, acetone, 2-butanone, benzene, toluene, and the like.

Upon completion of the reaction, the product is isolated by any convenient means such as filtration or centrifugation, for example, and dried to yield a material which can be employed in the preparation of addition polymers without further purification.

The ethylenically unsaturated, primary amino group containing polymerizable monomers of this invention can be homopolymerized or reacted with at least one other ethylenically unsaturated monomer to form a polymeric substance. The copolymers employed in photographic materials according to the practice of this invention are addition copolymers containing at least about 0.1%, generally about 0.1% to about 1.4% by weight of primary amino groups.

The molecular weights of the polymers employed in photographic emulsions and elements according to the practice of this invention are subject to wide variation, but are often in the range of about 5,000 to about 800,000. The polymers of this invention, therefore, contain polymeric units of the following formula:

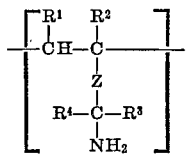

where $R^1$, $R^2$, $R^3$, $R^4$ and Z are as defined above, and the acid addition salts of said polymeric units.

A particularly useful class of polymers containing primary amino groups and which can be employed as substitutes for gelatin in photographic emulsions and elements is prepared by copolymerizing a monomer of this invention having the structure of Formula I with at least one other ethylenically unsaturated polymerizable monomer which forms addition polymers, such as vinyl esters, amides, nitriles, ketones, halides, ethers, alpha-beta-unsaturated acids or esters thereof, olefins, diolefins and the like, as exemplified by acrylonitrile, methacrylonitrile, styrene, alpha-methylstyrene, acrylamide, vinyl chloride, methyl vinyl ketone, fumaric, maleic and itaconic esters, 2-chloroethyl vinyl ether, acrylic acid, sodium methacryloyloxyethyl sulfate, methacrylic acid, dimethylaminoethyl methacrylate, 4,4,9-trimethyl-8-oxo-7-oxa-4-azonia-9-decene - 1 - sulfonate, N-vinylsuccinamide, N-vinylphthalimide, N-vinylpyrazolidone, butadiene, isoprene-vinylidene chloride, ethylene and the like.

Where the copolymers of this invention are used as binding agents in photographic materials to achieve good dimensional stability, good adhesion to the film support or improved resistance to abrasion the preferred copolymers contain (A) at least about 50% by weight of a monomer having the formula:

where $R^6$ is the same as $R^2$ defined above and $R^7$ is alkyl containing from 1 to 12 carbon atoms, straight or branched chain, preferably 1 to 6 carbon atoms, as exemplified by methyl, propyl, isobutyl, octyl, decyl and the like, (B) between about 3 and about 30% by weight of acrylic acid or an ester monomer having the formula:

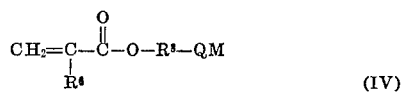

where $R^6$ is as previously defined; $R^8$ has its valence bonds on different carbon atoms and is a member selected from the group consisting of a divalent hydrocarbon radical and divalent aliphatic hydrocarbon radicals, in which a chain of carbon atoms joining the oxygen and Q radicals in the above formula is interrupted by an atom from Group VI–A of the Periodic Table having an atomic weight of less than about 33, i.e., at least one —O— and/or —S— radical interrupts the carbon chain, Q is —OSO$_2$O— or —SO$_2$O— and M is a cation and (C) between about 2 to about 20% by weight of a monomer of this invention including the acid addition salts thereof.

Where $R^8$ in Formula IV above is hydrocarbon, it can be any aliphatic, cycloaliphatic or aromatic radical and will generally contain up to about 12 carbon atoms. Preferred hydrocarbon $R^8$ radicals are alkylene radicals, generally those containing 2 to 4 carbons. $R^8$ can also be a divalent aliphatic hydrocarbon radical in which there is an —O— and/or —S— radical and generally contains up to 12 carbon atoms. Such $R^8$ radicals can, therefore, be saturated or unsaturated, although saturated divalent alkylene groups in which the carbon chain is interrupted by oxygen and sulfur atoms are preferred. Suitable $R^8$ radicals include ethylene, trimethylene, propylene, tetramethylene, 1,3-isobutylene, pentamethylene, hexamethylene, octamethylene, phenylene, biphenylylene, naphthylene, cyclopentylene, cyclohexylene, 2-butylene, butynylene, 2-oxatrimethylene, 3-thiapentamethylene and the like. M in Formula IV above is a cation, as exemplified by hydrogen, an alkali metal such as sodium or potassium, the cation of an organic amine such as triethylamine and diethanolamine, ammonium and the like.

Illustrative examples of compounds represented by Formula IV include sodium methacryloyloxyethyl sulfate, potassium 3 - (acryloyloxy)propyl sulfate, ammonium methacryloyloxypentyl sulfate, sodium 4-(acryloyloxy) butane - 2 - sulfonate, sodium 3-(acryloyloxy)propanesulfonate, sodium 2-(acryloyloxyethylthio)ethanesulfonate, potassium 2-(acryloyloxyethoxy)ethanesulfonate, and the like.

A preferred class of vinyl or addition copolymers, within the above class, which contains acrylic acid units preferably contains, in polymerized form, at least about 65% by weight of a monomer of the type represented by Formula III above, at least about 10% by weight of acrylic acid and at least about 2% by weight of a monomer of this invention, including the acid addition salts thereof. The preferred class of vinyl or addition copolymers in which ester units of the type represented by Formula IV are substituted for acrylic acid preferably contains, in polymerized form, at least about 65% by weight of a monomer of the type represented by Formula III above, at least about 3% by weight of said ester units and at least about 2% by weight of a monomer of this invention including the acid addition salts thereof.

As previously indicated, polymers containing both primary amino and active methylene functions and mixtures of polymers that contain primary amino groups and polymers containing active methylene groups exhibit an accelerated rate of insolubilization on treatment with aldehydic crosslinking agents.

These polymers and mixtures of polymers are wholly synthetic in composition and derivation and are considered to be within the bounds of this invention. Excluded therefrom are natural polymers such as gelatin and albumin that contain primary amino groups. The useful synthetic polymers and mixtures of synthetic polymers are characterized by their solubility in water at a pH of about 6 to about 7. In this respect they are to be distinguished from other synthetic polymers known in the art that contain either primary amino or active methylene functions, for they are latexes and by definition are not soluble in water. The subject polymers are further characterized in that a substantially accelerated rate of insolubilization in aqueous medium on treatment with aldehydic crosslinking agent is achieved only in the pH range of about 6 to about 7.

The active methylene and primary amino functions must be attached to a polymer. Nonpolymeric diamines, ethylene diamine for example, and active methylene compounds such as 2,4-pentane-dione are not effective. If either the active methylene or primary amino function is absent, insolubilization does not take place or it occurs much more slowly, requiring higher levels of crosslinking agent.

Useful polymerizable monomers containing the active methylene moiety include β-keto-esters and α-cyano esters of acrylic or methacrylic acid, acetoacetoxy esters of poly(vinyl alcohol), N-cyanoacetyl - N' - methacryloylhydrazine and the like.

A particularly useful class of water-soluble polymers containing primary amino groups and active methylene groups attached to the main chain of the polymer is prepared by copolymerizing (A) about 2 to about 20 weight percent of a primary amino group containing monomer of this invention including the acid addition salts thereof, (B) about 0.01 to about 10 weight percent of an acrylic ester having active methylene groups in the ester moiety or in a substituent alpha to the carbonyl group and represented by the formula:

(V)

where $R^9$ is hydrogen, methyl, ethyl, or an acyloxyalkyl group of the formula

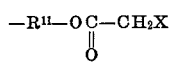

where $R^{11}$ is alkylene of 1 to 10 carbon atoms, X is aliphatic acyl or 1 to 10 carbon atoms or cyano, and $R^{10}$ is alkyl of 1 to 10 carbon atoms, cycloalkyl of from 4 to 10 carbon atoms, aryl of from 6 to 18 carbon atoms, or an acyloxyalkyl group as defined in $R^9$, provided that no more than one and only one of $R^9$ and $R^{10}$ is said acyloxyalkyl group and (C) at least 50% by weight of a monomer of the type represented by Formula III hereinabove.

Exemplary water-soluble polymers containing primary amino groups and active methylene groups include:

copoly[methyl acrylate-N-vinyl-N'-(2-amino-2-methylpropyl)succinamide-2-acetoacetoxyethyl methacrylate],
copoly[butyl methacrylate-N-(2-amino-2-methylpropyl)methacrylamide-methacrylic acid-3-cyanoacetoacetoxypropyl-α-butylacrylate],
copoly[propyl acrylate-N-(2-amino-2-methylpropyl)maleamic acid-ethyl-α-propionylacetoxyethylacrylate],
copoly[ethyl acrylate-N-(2-amino-2-methylpropyl)maleamic acid-5-propionylacetoxypentyl acrylate],
and the like.

A useful class of copolymers containing primary amino groups according to this invention includes polymers having the following formula:

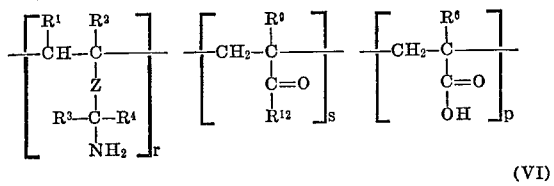
(VI)

where $R^1$, $R^2$, $R^3$, $R^4$, $R^6$, $R^9$ and Z are as defined hereinbefore, $R^{12}$ is amino, alkyl of 1 to 10 carbon atoms or acyloxyalkyl as defined in $R^9$, provided that no more than one and only one of $R^9$ and $R^{12}$ is an acyloxyalkyl group; $r$ represents about 5 to about 99 percent by weight of the total polymer, $s$ represents about 95 to about 1 percent by weight of the total polymer and $p$ represents 0 to about 60 percent by weight of the total polymer; provided that $r$ plus $s$ equals about 100 percent when $p$ is 0 and $r$ plus $s$ plus $p$ equals about 100 percent when $p$ is a positive value, and the acid addition salts thereof.

The comonomer

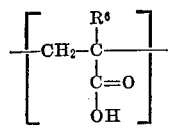

set out in Formula VI immediately above represents the molecule of polymerizable acid anion present when the primary amino group containing-monomer is an acid addition salt. The concentration of said comonomer can be equal to the concentration of primary amino group-containing monomer (i.e., $p$ equals $r$) or it can be deliberately in excess thereof (i.e., $p$ can be greater than $r$), as exemplified by copoly{methyl acrylate-methacrylic acid-N-[2 - amino-2-methylpropyl]methacrylamide, methacrylic acid salt-2-acetoacetoxyethyl methacrylate}. Further, when the primary amino group, containing monomer is not an acid salt, said comonomer represents acrylic acid or a substituted acrylic acid.

A preferred class of coplymers within the above class which can be employed as substitutes for gelatin in photographic materials has the formula:

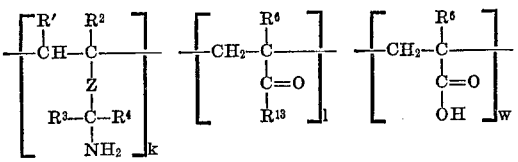

where $R^1$, $R^2$, $R^3$, $R^4$, $R^6$ and Z are as previously defined, $R^{13}$ is amino or alkyl of 1 to 10 carbon atoms; $k$ represents about 10 to about 90 percent by weight of the total polymer, $l$ represents about 90 to about 10 percent by weight of the total polymer; and $w$ represents 0 to about 36 percent by weight of the total polymer; provided that $k$ plus $l$ equals about 100 percent when $w$ is 0 and $k$ plus $l$ plus $w$ equals about 100 percent when $w$ is a positive value, and the acid addition salts thereof.

Illustrative examples of polymers containing primary amino groups that can be employed to advantage in this invention include:

copoly[methyl acrylate-N-vinyl-N'-(2-amino-2-methylpropyl)succinamide]
copoly[propyl methacrylate-N-(2-amino-2-methylpropyl)methacrylamide, methacrylic acid salt]
copoly[butyl acrylate-N-(2-amino-2-methylpropyl)maleamic acid]
copoly{pentyl methacrylate-N-[1-methyl-4-(2-aminoisopropyl)cyclohexyl]maleamic acid}

Typical examples of compounds having the structure of Formula III above include: methyl acrylate, methyl methacrylate, ethyl acrylate, propyl acrylate, isopropyl methacrylate, butyl acrylate, isobutyl acrylate and pentyl methacrylate.

A particularly useful class of polymers containing active methylene groups which can be used in physical admixture with polymeric materials containing primary amino groups includes units having the following formulae:

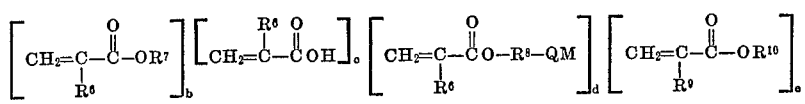

where each $R^6$, $R^7$, $R^8$, $R^9$, $R^{10}$, Q and M are as previously defined, and $b$ represents about 50 to about 90 percent by weight of the total polymer, each of $c$ and $d$ represents 0 to about 30 percent by weight of the total polymer, provided that one and only one of $c$ or $d$ is always 0, $e$ represents about 2 to about 20 percent by weight of the total polymer and $b$ plus $e$ plus $c$ or $d$ equals about 100 percent.

Water-soluble polymers containing active methylene groups that are useful in this invention include:

copoly(3-acryloyloxypropane-1-sulfonic acid, sodium salt-2-acetoacetoxyethyl methacrylate)
copoly[sodium methacryloyloxyethyl sulfate-methyl α-(acetoacetoxyethyl)acrylate]
copoly(ethyl acrylate-acrylic acid-2-acetoacetoxyethyl acrylate)
copoly[pentyl methacrylate-acrylic acid-5-(propionylacetoxy)pentyl methacrylate]
copoly[isopropylmethacrylate-acrylic acid-pentyl α-(cyanoacetoacetoxy)propylacrylate]

It will be appreciated that the immediate description of useful polymers and mixtures of polymers is merely illustrative and that other useful polymeric systems within the scope of this invention will be obvious to those skilled in the art.

Crosslinking agents which are especially effective in accelerating the rate of insolubilization of water-soluble polymers and mixtures of water-soluble polymers according to this invention include monoaldehydes such as formaldehyde and acetaldehyde; di(aldehydes) such as glyoxal, succinaldehyde, glutaraldehyde, β-methylglutaraldehyde; polymeric aldehydes such as oxyguar gum and poly(dialdehyde-dextrose); aldehydic acids such as mucochloric and mucobromic acids and the like.

The monomers of this invention can be homo- or copolymerized by any of the techniques known in the art such as by bulk, solution or emulsion polymerization techniques. However, for the preparation of photographic addenda, solution or emulsion polymerization procedures are most convenient.

The temperature at which the copolymers described herein are prepared is subject to wide variation since this temperature depends upon such variable features as the specific monomer used, duration of heating, pressure employed and like considerations. However, the polymerization temperature generally does not exceed about 110° C., and most often it is in the range of about 50 to about 100° C. The polymerization can be carried out in a suitable vehicle, for example, water or mixtures of water with water-miscible solvents, as exemplified by methanol, ethanol, propanol, isopropyl, alcohol, butyl alcohol, and the like. The pressure employed in the polymerization, if any, is usually only sufficient to maintain the reaction mixture in liquid form, although either superatmospheric or subatmospheric pressures can be used. The concentration of polymerizable monomer in the polymerization mixture can be varied widely with concentrations up to about 40% by weight and preferably about 20 to about 40% by weight based on the weight of the vehicle being satisfactory. Suitable catalysts for the polymerization reaction include, for example, the free radical catalysts, such as hydrogen peroxide, cumene hydroperoxide, water soluble azo type initiators and the like. In redox polymerization systems the usual ingredients can be employed. If desired, the polymer can be isolated from the reaction vehicle by freezing, salting out, precipitation or any other procedure suitable for this purpose.

As indicated in U.S. Pat. 3,142,568, issued July 28, 1964, and U.S. 3,514,293, it is sometimes advantageous to include a surface active agent or compatible mixtures of such agents in the preparation of vinyl or addition polymers and in coating photographic materials containing such polymers. Suitable wetting agents include the nonionic, ionic and amphoteric types as exemplified by the polyoxyalkylene derivatives, amphoteric amino acid dispersing agents, including sulfobetaines and the like.

Dispersions of photographic silver halide containing addition copolymers having pendant primary amino groups, in combination with photographic binding agents, such as gelatin, can be made in a variety of ways. For example, an aqueous gelatin dispersion of the photographic silver halide can be mixed with an aqueous dispersion or solution of the interpolymer. Alternatively, the photographic silver halide can be precipitated in an aqueous dispersion or solution of the copolymer with or without another colloid, depending upon the dispersing characteristics of the copolymer. In this case, a water-soluble silver salt such as silver nitrate is admixed with a water-soluble halide such as potassium bromide in the presence of the mixture. In still another procedure, the photographic silver halide is precipitated in an aqueous gelatin solution and digested in the conventional manner known to the art. After digestion, but prior to coating, there is added to the emulsion an aqueous dispersion of the copolymer containing pendant primary amino groups. The bulk of the resulting dispersion can be increased by the addition of more of the copolymer and/or natural or synthetic colloids or other binding agents suitable for use in photographic silver halide emulsions. Suitable hydrophilic materials include both naturally occurring substances such as proteins, for example, gelatin, gelatin derivatives, cellulose derivatives, polysaccharides such as dextran, gum arabic and the like; and synthetic polymeric substances such as water-soluble polyvinyl compounds such as poly(vinylpyrrolidone), acrylamide polymers and the like.

The gelatin substitutes described herein can be employed in the binding agent in one or more layers of a photographic silver halide element. However, photographic silver halides are generally precipitated in the presence of binding agents such as gelatin or other colloids which exhibit very good peptizing action. Therefore, the photographic silver halide emulsions or layers of this invention will generally contain some binding agent such as gelatin which exhibits this very good peptizing action. Generally, the concentration of the copolymers described herein as gelatin substitutes will be in the range of about 20 to about 85% often in the range of about 50 to about 85% by weight based on total binding agent (dry weight) employed in photographic emulsions, photographic emulsion layers or other layers of a photographic element. In the preferred case, the remainder of the binding agent is gelatin, although other colloids also give good results. Where the polymers are used in photographic elements in layers other than the emulsion layers, for example, in filter layers, antihalation layers, antiabrasion layers, antistatic layers, barrier layers, receiving layers for diffusion transfer processes and the like, they can be used as the sole vehicle or in admixture with natural or synthetic colloids such as are mentioned hereinbefore.

The silver halide emulsions used with this invention can comprise silver chloride, silver bromide, silver bromoiodide, silver chlorobromoiodide or mixtures thereof. The emulsions may be coarse or fine grain and can be prepared by any of the well-known procedures, e.g., single-jet emulsions, double-jet emulsions such as Lippmann emulsions, ammoniacal emulsions, or thiocyanate- or thioether-ripened emulsions such as those described in Nietz et al., U.S. Pat. 2,222,264; Illingsworth, U.S. Pat. 3,320,069; and McBride, U.S. Pat. 3,271,157. Surface-image emulsions may be used or internal-image emulsions such as those described in Davey et al., U.S. Pat. 2,592,250; Lowe et al., U.S. Pat. 3,206,313; Berriman et al., U.S. Pat. 3,367,778; and Bacon et al., Belgian Pat. 704,255. If desired, mixtures of surface- and internal-image emulsions may be used as described in Luckey et al., U.S. Patent 2,996,382. Negative-type emulsions may be used or direct-positive emulsions such as those described in Leermakers, U.S. Pat. 2,184,013; Kendall et al., U.S. Pat. 2,541,472; Berriman U.S. Pat. 3,367,778; Schouivenaars, British Pat. 723,019; Illingsworth, French Pat. 1,520,821; Ives U.S. Pat. 2,563,785; Knott et al., U.S. Pat. 2,456,953; and Land, U.S. Pat. 2,861,885.

The emulsions used with this invention may be sensitized with chemical sensitizers, such as with reducing agents; sulfur, selenium or tellurium compounds, gold, platinum or palladium compounds, or combinations of these. Suitable procedures are described in Shepard, U.S.

Pat. 1,623,449; Allen, U.S. Pat. 2,399,083; McVeigh, U.S. Pat. 3,297,447; and Dunn, U.S. Pat. 3,297,446.

Photographic elements containing the polymers of this invention may contain incorporated developing agents such as hydroquinones, catechols, aminophenols, 3-pyrazolidones, ascorbic acid and its derivatives, reductones and phenylenediamines. Combinations of developing agents can be employed in the practice of the invention. The developing agents can be in a silver halide emulsion and/or in another suitable location in the photographic element. The developing agents may be added from suitable solvents or in the form of dispersions as described in Yackel, U.S. Pat. 2,592,368, and Dunn et al., French Pat. 1,505,778.

The photographic and other hardenable layers used in the practice of this invention can be hardened by various organic or inorganic hardeners, alone or in combination, such as the aldehydes, and blocked aldehydes, ketones, carboxylic and carbonic acid derivatives, sulfonate esters, sulfonyl halides and vinyl sulfones, active halogen compounds, epoxy compounds, aziridines, active olefins, isocyanates, carbodiimides, mixed-function hardeners and polymeric hardeners such as oxidized polysaccharides such as dialdehyde starch and oxyguar gum and the like.

The described photographic emulsion layers and other layers of a photographic element employed in the practice of this invention can also contain, alone or in combination with hydrophilic water-permeable colloids, other synthetic polymeric compounds such as dispersed vinyl compounds such as in latex form and particularly those which increase the dimensional stability of the photographic materials. Suitable synthetic polymers include those described, for example, in U.S. Pats. 3,142,568 of Nottorf issued July 28, 1964; 3,193,386 of White issued July 6, 1965; 3,062,674 of Houck, Smith and Yudelson issued Nov. 6, 1962; 3,220,844 of Houck, Smith and Yudelson issued Nov. 30, 1965; 3,287,289 of Ream and Fowler issued Nov. 22, 1966; and Dykstra, U.S. Pat. 3,411,911; particularly effective are those water-insoluble polymers of alkyl acrylates and methacrylates, acrylic acid, sulfoalkyl acrylates or methacrylates, those which have crosslinking sites which facilitate hardening or curing and those having recurring sulfobetaine units as described in Canadian Pat. 774,054.

The photographic layers and other layers of a photographic element employed and described herein can be coated on a wide variety of supports. Typical supports include cellulose nitrate film, cellulose ester film, poly(vinyl acetal) film, polystyrene film, poly(ethylene terephthalate) film, polycarbonate film and related films or resinous materials, as well as glass, paper, metal and the like. Typically, a flexible suport is employed, especially a paper support, which can be partially acetylated or coated with baryta and/or an alpha-olefin polymer, particularly a polymer of an alpha-olefin containing 2 to 10 carbon atoms such as polyethylene, polypropylene, ethylene butene copolymers and the like.

The photographic layers employed in the practice of this invention can contain plasticizers and lubricants such as polyalcohols, e.g., glycerin and diols of the type described in Milton, U.S. Pat. 2,960,404: fatty acids or esters such as those described in U.S. Pat. 2,588,765 and Duane, U.S. Pat. 3,121,060; and silicone resins such as those described in Du Pont British Pat. 955,061.

The photographic layers employed in the practice of this invention may contain surfactants such as saponin, anionic compounds such as the alkyl aryl sulfonates described in Baldsiefen, U.S. Pat. 2,600,831 and amphoteric compounds such as those described in Ben-Ezra, U.S. Pat. 3,133,816.

The light-sensitive silver halide emulsion of multilayer photographic elements containing the polymeric compounds of this invention can conveniently be ortho-sensitized or pansensitized with spectral sensitizing dyes. For instance, these emulsions can be spectrally sensitized by treating with a solution of a sensitizing dye in an organic solvent or the dye may be added in the form of a dispersion as described in Owens et al., French Pat. 1,482,774. Sensitizing dyes useful in sensitizing such emulsions are described, for example, in U.S. Pat. 2,526,632 of Brooker and White issued Oct. 24, 1950; 2,503,776 of Sprague issued Apr. 11, 1950; 2,493,748 of Brooker et al.; and 3,384,486 of Taber et al. Spectral sensitizers which can be used include the cyanines, merocyanines, complex (trinuclear) cyanines, complex (trinuclear) merocyanines, styryls and hemicyanines. The cyanines may contain such basic nuclei as thiazoles, oxazoles, selenazoles or imidazoles. Such nuclei may contain sulfoalkyl, carboxyalkyl and alkylamino groups and may be fused to benzene or naphthalene rings either unsubstituted or substituted with halogen, phenyl, alkyl or alkoxy groups. The dyes may be symmetrical or unsymmetrical and may contain alkyl, phenyl or heterocyclic substituents on the polymethine chain. The merocyanine dyes may contain the basic nuclei mentioned above as well as acid nuclei such as thiohydantoins, rhodanines, oxazolidine diones and barbituric acids. The acid nuclei may be substituted with alkyl groups, phenyl groups, carboxy groups, sulfo groups or amino groups. The emulsions may contain supersensitizing dye combinations such as those described in U.S. Pats. 2,739,964 by Brooker et al.; 2,688,545 by Carroll et al.; 2,701,198 by Carroll et al.; 2,739,149 by Van Lare; and British Pat. 1,128,840 by Fuji; or the dyes may be supersensitized with ascorbic acid derivatives, azaindenes, cadmium salts, and organic sulfonic acids as described in U.S. Pats. 2,933,390 by McFall et al. and 2,937,089 by Jones et al.

The photographic layers used in the practice of this invention may be coated by various coating procedures including dip coating, air knife coating, curtain coating or extrusion coating using hoppers of the type described in Beguin, U.S. Pat. 2,681,294. If desired, two or more layers may be coated simultaneously by the procedures described in Russell, U.S. Pat. 2,761,791 and Wynn, British Pat. 837,095.

The primary amino group containing polymers of this invention may be used with elements designed for colloid transfer processes such as described in Yackel et al., U.S. Pat. 2,716,059; silver salt diffusion transfer processes such as described in U.S. Pats. 2,352,014 by Rott, 2,543,181 by Land, 3,020,155 by Yackel and 2,861,885 by Land; color-image transfer processes such as described in U.S. Pats. 3,087,817, 3,185,567 and 2,983,606 by Rogers, 3,253,915 by Weyerts, 3,227,550, 3,227,551 and 3,227,552 by Whitmore et al., and 3,415,644, 3,415,645 and 3,415,646 by Land; and imbibition transfer processes as described in U.S. Pat. 2,882,156 by Minsk.

The novel polymers of this invention may be used with elements designed for color photography, for example, elements containing color-forming couplers such as those described in U.S. Pats. 2,376,679 by Frohlich et al.; 2,322,027 by Vittum et al.; 2,801,171 by Fierke et al.; 2,698,794 by Godowsky; 3,227,554 by Barr et al.; and 3,046,129 by Graham; or elements to be developed in solutions containing color-forming couplers such as those described in U.S. Pats. 2,252,718 by Mannes and Godowsky; 2,592,243 by Carroll et al.; and 2,950,970 by Schwan.

The following examples are included for a further understanding of the invention.

Example 1.—N-vinyl-N'-(2-amino-2-methylpropyl) succinamide

To 8.8 grams (0.1 mole) of 1,2-diamino-2-methylpropane dissolved in 50 ml. of benzene was added dropwise with stirring over a period of four hours 12.5 grams (0.1 mole) of N-vinylsuccinimide dissolved in 50 ml. of benzene. The solution was allowed to remain at room temperature for 48 hours. The white solid which had formed during this time was collected and dried in vacuo. The compound N-vinyl-N'-(2-amino - 2 - methylpropyl)

succinamide melted at 133–134° C. and the yield was 17.0 grams (80 percent).

*Analysis.*—Calcd. for $C_{10}H_{19}N_3O_2$ (percent): C, 56.0; H, 8.9; N, 19.8. Found (percent): C, 55.7; H, 9.0; N, 19.6.

Example 2.—N-(2-amino-2-methylpropyl)maleamic acid

To 8.8 grams (0.1 mole) of 1,2-diamino-2-methylpropane dissolved in 200 ml. of acetone and cooled in an ice bath was added dropwise with stirring over a period of three hours 9.8 grams (0.1 mole) of maleic anhydride dissolved in 50 ml. of acetone. A white solid began forming immediately. The mixture was allowed to remain overnight at room temperature, then the solid was collected and dried. The product, N-(2-amino-2-methylpropyl)maleamic acid melted at 179–182° C. and the yield was 16.2 grams (87 percent).

*Analysis.*—Calcd. for $C_8H_4N_2O_3$ (percent): C, 51.5; H, 7.5; N, 15.0. Found (percent): C, 51.7; H, 7.6; N, 14.8.

Example 3.—N-[1-methyl-4-(2-aminoisopropyl) cyclohexyl]maleamic acid

To 17.0 grams (0.1 mole) of 1,8-menthanediamine dissolved in 200 ml. of acetone and cooled in an ice bath was added dropwise with stirring over a period of three hours 9.8 grams (0.1 mole) of maleic anhydride dissolved in 50 ml. of acetone. A white solid began forming immediately. The mixture was allowed to remain overnight at room temperature. The product, N-[1-methyl-4-(2-aminoisopropyl)cyclohexyl]maleamic acid, was then collected and dried giving 25.0 grams (96 percent) of white solid melting at 212–214° C.

*Analysis.*—Calcd. for $C_{14}H_{24}N_2O_3$ (percent): C, 63.0; H, 9.0; N 10.5. Found (percent): C, 62.1; H, 9.6; N, 10.4.

Example 4.—N-(2-amino-2-methylpropyl)methacrylamide, methacrylic acid salt

To 8.8 grams (0.1 mole) of 1,2-diamino-2-methylpropane in 50 ml. of diethyl ether was added dropwise with stirring and cooling over a period of 30 minutes, 15.4 grams (0.1 mole) of methacrylic anhydride in 50 ml. of diethyl ether. A white solid began to precipitate after 30 minutes. The mixture was stirred at room temperature for 1 hour after the addition of methacrylic anhydride and then filtered and dried. The yield of white solid, N-(2-amino-2-methylpropyl)methacrylamide, methacrylic acid salt, melting at 132–133° C. was 22.7 grams (94 percent).

*Analysis.*—Calcd. for the hydrochloride salt $C_8H_{17}ClN_2O$ (percent): C, 50.0; H, 8.9; N, 14.6; Cl, 18.2. Found (percent): C, 49.7; H, 8.9; N, 14.2; Cl, 18.6

As previously indicated, compounds of the type prepared according to Examples 1–4 can be homopolymerized. This procedure is illustrated by Examples 5 and 6.

Example 5.—Poly[N-vinyl-N'-(2-amino-2-methylpropyl)succinamide]

A solution of 5 grams of monomer from Example 1 and 0.03 gram of 2,2'-azobis(2-methylpropionitrile) in 10 ml. of dimethylformamide was degassed with nitrogen and placed in a 60° C. bath for 15 hours. The solution became viscous and slightly yellow. A sample of this solution consisting of poly[N-vinyl-N'-(2-amino-2-methylpropyl)succinamide], could be gelled by the addition of formaldehyde or glutaraldehyde and also surface-hardened with formaldehyde vapor.

Example 6.—Copoly[N-(2-amino-2-methylpropyl) methacrylamide-methacrylic acid]

A solution of 75 grams of N-(2-amino-2-methylpropyl)methacrylamide, methacrylic acid salt in 675 ml. of distilled water was purged with nitrogen for 15 minutes, treated with a solution of 0.38 gram of 2,2'-azobis(2-methylpropionitrile) in a few milliliters of acetone and stirred at 60° C. for 5 hours. The resulting polymer dope, co- 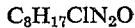poly[N - (2 - amino - 2 - methylpropyl)methacrylamide-methacrylic acid], was then cooled to room temperature and diluted with 750 ml. of distilled water. It then contained 4.95 percent solids and had a bulk viscosity of 30 centipoises as determined on a Brookfield Viscometer.

As previously pointed out, compounds of the type prepared according to the procedures of Examples 1–4 will polymerize with other polymerizable, ethylenically-unsaturated monomers, for example to form copolymers containing primary amino groups appended to the polymer backbone. Examples 7–11 are illustrative of this procedure.

Example 7

A terpolymer of methyl acrylate (72 parts), 3-acryloyloxypropane-1-sulfonic acid, sodium salt (18 parts) and N-vinyl-N'-2-amino - 2 - methylpropyl)succinamide (10 parts) was prepared as follows.

In a two-liter, four-necked flask, 375 ml. of distilled water was degassed with nitrogen at 97° C. To the water was added 2 ml. of octyl phenoxy polyethoxyethanol, known as Triton X–100 (Rohm Haas), 1.0 bisulfite. potassium persulfate and 0.1 gram of sodium bisulfite. The following simultaneous additions were immediately begun and completed in 12 minutes.

(1) 90.0 grams of methyl methacrylate,
(2) 12.5 grams of N-vinyl-N'-(2-amino-2-methylpropyl) succinamide, 22.5 grams of 3-acryloyloxypropane-1-sulfonic acid, sodium salt, 4 ml. of Triton X–100, 0.23 gram of sodium bisulfite and 3 ml. of concentrated hydrochloric acid in 125 ml. of degassed distilled water.

After the additions, the latex was stirred at 97° C. until a negative test with potassium iodide indicated the absence of persulfate (about 35 minutes). The latex was chilled to room temperature, filtered and raised to pH 5 with 2.5 percent sodium hydroxide solution. Evaporation of a sample of the translucent latex indicated it contained 20.0 percent solids and gave a clear, brittle film. The latex was stable to the addition of 2.5 M cadmium chloride solution.

Example 8

A terpolymer of methyl acrylate (85.5 parts), 3-acryloyloxypropane-1-sulfonic acid sodium salt (4.5 parts) and N-vinyl-N'-(2-amino-2-methylpropyl)succinamide (10 parts) was prepared in a manner similar to Example 7. Surfactant 10G (Olin-Mathieson), an alkylphenoxypolyglycidol prepared from nonylphenol and glycidol, was used as the emulsifying agent. The latex polymer contained 21.4 percent solids and was stable to the addition of 2.5 M cadmium chloride solution. Evaporation of a small sample of the latex gave a clear, flexible film.

Example 9

A terpolymer of methyl acrylate (72 parts), 3-acryloyloxypropane-1-sulfonic acid, sodium salt (18 parts) and N-[1-methyl-4-(2-amino - 2 - propyl)cyclohexyl]maleamic acid (10 parts) was prepared according to the procedure of Example 7.

The latex polymer contained 22.0 percent solids and it was stable to the addition of 2.5 M cadmium chloride solution. Evaporation of a small sample of the latex gave a clear, slightly brittle film.

Example 10

A terpolymer of methyl acrylate (85.5 parts), 3-acryloyloxypropane-1-sulfonic acid, sodium salt (4.5 parts) and N-[1-methyl-4-(2-amino-2-propyl)cyclohexyl]maleamic acid (10 parts) was prepared in the manner of Example 8. The emulsion polymer contained 20.1 percent solids. Evaporation of a sample of the latex gave a clear, flexible film. The latex was stable to the addition of 2.5 M cadmium chloride solution.

Example 11

A terpolymer of methyl acrylate (72 parts), 3-acryloyloxypropane-1-sulfonic acid, sodium salt (18 parts) and N-(2-amino-2-methylpropyl)maleamic acid (10 parts) was prepared according to the procedure of Example 7. The emulsion polymer contained 19.7 percent solids. Evaporation of a small sample of the latex gave a brittle film. The latex was stable to the addition of 2.5 M cadmium chloride solution.

Example 12

A terpolymer of methyl acrylate (85.5 parts), 3-acryloyloxypropane-1-sulfonic acid, sodium salt (4.5 parts) and N-(2-amino-2-methylpropyl)maleamic acid (10 parts) was prepared by the method of Example 8. The emulsion polymer contained 20.0 percent solids. Evaporation of a sample of the latex gave a flexible film. The latex was stable to the addition of 2.5 M cadmium chloride solution.

Another class of vinyl or addition copolymers of this invention, which can be employed as gelatin substitutes in photographic materials, are copolymers in which acrylic acid is used in place of a polymerizable ethylenically unsaturated sulfoester compound. The preparation of this type of polymer is illustrated by Examples 13–15.

Example 13

A terpolymer of methyl acrylate (72.8 parts), acrylic acid (18.2 parts) and N-[1-methyl-4-(2-amino-2-propyl)cyclohexyl]maleamic acid (9 parts) was prepared by the method of Example 8. The opaque solution polymer contained 21.4 percent solids. The pH at the completion of the polymerization was 6.9, and no adjustment in pH was made. Evaporation of a sample of the polymer solution gave a cloudy, flexible film.

Example 14

A terpolymer of methyl acrylate (72.8 parts), acrylic acid (18.2 parts) and N-vinyl-N'-(2-amino-2-methylpropyl)succinamide (9 parts) was prepared in a manner similar to Example 8. The solution polymer contained 21.5 percent solids. The pH of the solution was 6.8 at the completion of the polymerization and no adjustment in pH was made. Evaporation of a sample of the solution polymer gave a clear, brittle film.

Example 15

A terpolymer of methyl acrylate (72.8 parts), acrylic acid (18.2 parts) and N-(2-amino-2-methylpropyl)maleamic acid (9 parts) was prepared according to the procedure of Example 8. The solution polymer contained 20.8 percent solids. The pH of the solution was 6.8 at the completion of the polymerization and no adjustment in pH was made. Evaporation of a sample of the polymer solution gave a slightly brittle film.

Other useful copolymers of this invention are illustrated in Examples 16–18 below.

Example 16

A copolymer of acrylamide (90 parts) and N-vinyl-N'-(2-amino-2-methylpropyl)succinamide (10 parts) was prepared by adding 9.0 grams of acrylamide, 1.0 gram of N-vinyl-N'-(2-amino-2-methylpropyl)succinamide and 0.05 gram 2,2'-azobis(2-methylpropionitrile) to a mixture of 64 ml. of distilled water and 27 ml. of ethyl alcohol. The solution was degassed with nitrogen and placed in a 60° C. bath for three hours. A viscous solution was obtained containing 14.1 percent solids. The polymer hardened with formaldehyde when combined with gelatin.

Example 17

A copolymer of acrylamide (90 parts) and N-(2-amino-2-methylpropyl)maleamic acid (10 parts) was prepared in the manner of Example 16. The polymer hardened with formaldehyde when combined with gelatin.

Example 18

A copolymer of acrylamide (90 parts) and N-[1-methyl-4-(2-amino-2-propyl)cyclohexyl]maleamic acid (10 parts) was prepared in a manner similar to Example 16. The polymer hardened with formaldehyde when combined with gelatin.

Example 19

A copolymer of acrylic acid (50 parts) and N-vinyl-N'-(2-amino-2-methylpropyl)succinamide (50 parts) was prepared as follows. A solution of 5.4 g. of acrylic acid and 16.05 g. of N-vinyl-N'-(2-amino-2-methylpropyl)succinamide in 86 ml. of distilled water was purged with nitrogen for about 10 minutes, treated with a solution of 0.11 g. of 2,2'-azobis(2-methylpropionitrile) in a few ml. of acetone, and then stirred at 60° C. overnight. Upon cooling, the resulting dope had a solids content of 20 percent.

Combinations of gelatin and the primary amino group containing copolymers of this invention show improved resistance to abrasion and better adhesion to film supports. Examples 20 and 21 are presented in illustration thereof.

Example 20

Control coatings containing one part by weight of gelatin and one part by weight of a copolymer of methyl acrylate (95 parts) and 3-acryloyloxypropane-1-sulfonic acid, sodium salt (5 parts), prepared according to the procedure of Example 2 of U.S. Pat. 3,411,911, at varying formaldehyde levels, were made on a polyester support at 674 mg. of total vehicle per square foot. Additional coatings were made identically except for the replacement of the copolymer used in the control samples by the copolymers of Examples 8, 10 and 12, respectively. The coated elements were rated for resistance to abrasion and adhesion to the support after two minutes in Kodak D-11 developer, three minutes fixing, and a 10 minute wash at 68° F. The following rating scheme was used.

0—coating floats off support
1—coating rubs off with ease
2—coating rubs off with difficulty
3—coating comes off only by scratching with fingernail
4—coating comes off only by scratching with steel blade

TABLE I

| Example No. | Percent formaldehyde [1] | 2-min. D-11 | 3-min. fix | 10-min. wash |
|---|---|---|---|---|
| Control | 2.5 | 1+ [2] | 1+ | 1+ |
|  | 5.0 | 1+ | 1+ | 1+ |
|  | 10.0 | 1+ | 1+ | 1+ |
| 8 | 2.5 | 3 | 4 | 4 |
|  | 5.0 | 4 | 4 | 4 |
|  | 10.0 | 4 | 4 | 4 |
| 10 | 2.5 | 2 | 2 | 2 |
|  | 5.0 | 3 | 3 | 3 |
|  | 10.0 | 3 | 3 | 3+ |
| 12 | 2.5 | 3 | 3+ | 3+ |
|  | 5.0 | 3+ | 3+ | 3+ |
|  | 10.0 | 3+ | 3+ | 3+ |

[1] Based on the weight of gelatin present.
[2] A plus rating indicates that the coating is slightly better than the number ascribed to it.

Example 21

Acrylic acid copolymers of this invention were tested according to the procedure of Example 20. The control coatings contained equal parts of gelatin and a copolymer of methyl acrylate (80 parts) and acrylic acid (20 parts), prepared in the manner of Example E of U.S. Pat. 3,062,674. Additional coatings were made identically except for the replacement of the copolymer used in the control samples by the copolymers of Examples 13 and 14, respectively. The processed coatings were evaluated for resistance to abrasion and adhesion by the method of Example 20. The results are set out in Table II below.

TABLE II

| Example No. | Percent formaldehyde [1] | 2-min. D-11 | 3-min. fix | 10-min. wash |
|---|---|---|---|---|
| Control | 2.5 | 2 | 2+ [2] | 2 |
|  | 5.0 | 2 | 2+ | 2 |
|  | 10.0 | 2 | 2+ | 2 |
| 13 | 2.5 | 3+ | 3+ | 3 |
|  | 5.0 | 3+ | 3+ | 3 |
|  | 10.0 | 3+ | 3+ | 3 |
| 14 | 2.5 | 3 | 4 | 4 |
|  | 5.0 | 3 | 4 | 4 |
|  | 10.0 | 3 | 4 | 4 |

[1] Based on the weight of gelatin present.
[2] A plus rating indicates that the coating is slightly better than the number ascribed to it.

The photographic properties of the copolymers of this invention are illustrated typically by Example 22 which follows:

Example 22

Samples of the compounds listed in Table III below were added to separate portions of a high-speed silver bromoiodide emulsion which had been panchromatically sensitized with a cyanine dye. Each emulsion sample was coated on a cellulose acetate film support at a coverage of 432 mg. of silver and 980 mg. of gelatin per square foot. A sample of each film coating was exposed on an Eastman 1B sensitometer, processed for five minutes in Kodak DK-50 developer, fixed washed and dried with the following results.

TABLE III

| Example No. | Conc., g./mole of silver | Relative speed | Gamma | Fog |
|---|---|---|---|---|
| Control | | 100 | 1.31 | .21 |
| Control polymer of Example 21 | 45 | 94 | 1.25 | .18 |
| Control | | 100 | 1.38 | .14 |
| 8 | 45 | 87 | 1.06 | .16 |
| Control | | 100 | 1.29 | .16 |
| 10 | 45 | 95 | 1.23 | .16 |
| 12 | 45 | 102 | 1.23 | .13 |
| Control | | 100 | 1.29 | .12 |
| Control polymer of Example 22 | 45 | 110 | 1.57 | .09 |
| Control | | 100 | 1.38 | .16 |
| 13 | 45 | 110 | 1.38 | .14 |
| 14 | 45 | 107 | 1.43 | .16 |

It has been shown hereinabove that in addition to their other advantageous properties, the copolymers of this invention do not adversely affect the sensitometric properties of photographic silver halide elements containing them. Furthermore, certain of the primary amino group containing polymers of this invention are effective as fog restraining agents when incorporated in photographic emulsions.

As previously indicated, still other polymers according to this invention exhibit a substantially increased rate of insolubilization in an aqueous medium when treated with aldehydic crosslinking agents such as formaldehyde and glyoxal. This aspect of the invention is illustrated by the examples which follow.

Example 23

A copolymer of equal parts by weight of methacryloyloxyethyl sulfate, sodium salt and 2-acetoacetoxyethyl methacrylate was prepared by adding 10.0 grams of sodium methacryloyloxyethyl sulfate, 10.0 grams of 2-acetoacetoxyethyl methacrylate and 0.2 gram of 2,2'-azobis(2-methylpropionitrile) to 134 ml. of water and 27 ml. of ethanol at 70° C. and maintaining at this temperature under a nitrogen atmosphere for two hours to give a clear, slightly viscous solution. The pH was adjusted to 6.0 with 2.5 percent sodium hydroxide.

Example 24

A copolymer of methyl acrylate (49 parts) and N-(2-amino-2-methylpropyl)methacrylamide, methacrylic acid salt (51 parts) was prepared by the following procedure. To 313 ml. of distilled water and 41 ml. of ethanol at 70° C. were added 30.8 grams of methyl acrylate, 31.7 grams of N-(2-amino-2-methylpropyl)methacrylamide, meth- acrylic acid salt, and 0.5 gram of 2,2'-azobis(2-methylpropionitrile). The solution was degassed with nitrogen and kept at 70° C. for one hour to give a clear, viscous solution. The pH was adjusted to 6.5 with 2.5 percent sodium hydroxide solution to give a polymer solution containing 14.6 percent solids.

Example 25

A copolymer of ethyl acrylate (72.4 parts), acrylic acid (24.1 parts) and 2-acetoacetoxyethyl methacrylate (3.5 parts) wans prepared in the following manner. In a two-liter, four-necked flask, 400 ml. of distilled water is degassed with nitrogen at 80° C. To the water was added 4 ml. of Surfactant 10G, 1.0 gram of potassium persulfate and 0.1 gram of sodium bisulfite. The following simultaneous additions were immediately begun and completed in seven minutes.

(1) 90.4 grams of ethyl acrylate and 4.4 grams of 2-acetoacetoxyethyl methacrylate
(2) 30.2 grams of acrylic acid, 0.23 gram of sodium bisulfite, and 4 ml. of Surfactant 10G in 100 ml. of degassed distilled water.

After the additions, the latex was stirred at 80° C. until a negative test with potassium iodide indicated the absence of persulfate (about three hours). The latex was chilled to room temperature, and 500 ml. of distilled water and 200 ml. of isopropyl alcohol were added. The latex was filtered and raised to pH 6.5 with 10.0 percent sodium hydroxide to give a clear, pale blue, viscous solution containing 9.2 percent solids.

Example 26

A copolymer of methyl acrylate (47.3 parts, monomer A), N-(2-amino-2-methylpropyl)methacrylamide, methacrylic acid salt (49.2 parts, monomer B) and 2-acetoacetoxyethyl methacrylate (3.5 parts, monomer C) was prepared according to the method of Example 24. A clear, viscous solution was obtained. The polymer solution was cooled and the pH adjusted to 6.5 with 2.5 percent sodium hydroxide.

Example 27

A copolymer of N-(2-amino-2-methylpropyl)methacrylamide, methacrylic acid salt (99 parts) and 2-acetoacetoxyethyl methacrylate (1 part) was prepared as follows. A solution of 31.0 g. of N-(2-amino-2-methylpropyl)methacrylamide, methacrylic acid salt and 0.25 g. of 2,2'-azobis(2-methylpropionitrile) was degassed with nitrogen and held at 70° C. for 2 hours. The resulting clear viscous solution had a pH of 7.3 which was adjusted to pH 6.5 with 15% sulfuric acid. The solution of polymer contained 15.1 percent solids. Evaporation of a sample yielded a clear brittle film. A 10 g. sample of the polymer solution insolubilized in 40 sec. when treated with 10 drops of a 1.7 percent solution of formaldehyde.

A series of copolymers of monomers A, B and C was prepared according to the procedure of Example 26, except that different proportions by weight were used as shown in Table IV below:

TABLE IV

| Example No. | Parts by weight of monomer | | |
|---|---|---|---|
| | A | B | C |
| 28 | 48.99 | 50.98 | 0.03 |
| 29 | 48.95 | 50.95 | 0.10 |
| 30 | 48.76 | 50.74 | 0.50 |
| 31 | 48.51 | 50.49 | 1.00 |

The rapid insolubilization of polymeric systems containing, primary amino groups and active methylene groups by aldehyde crosslinking agents is demonstrated by the following procedure. To 10 grams of a solution of the material to be tested at pH 6.5 is added 10 drops of a 1.7 percent aqueous formaldehyde solution. The mixture is stirred and the time required for insolubilization of the solution is determined. The systems test and the results obtained are summarized in Table V.

In addition, certain of the polymers of this invention are effective antifoggants for silver halide photographic

TABLE V

| Example No. | System | Percent solids in polymer tested | Primary amino groups | Active methylene groups | Insolubilization time |
|---|---|---|---|---|---|
| 32 | Example 24 | 14.6 | Yes | No | More than 24 hours. |
| 33 | Example 23 | 10.7 | No | Yes | Do. |
| 34 | Example 28 | 15 | Yes | Yes | Do. |
| 35 | Example 29 | 15 | Yes | Yes | 226 seconds. |
| 36 | Example 30 | 15 | Yes | Yes | 45 seconds. |
| 37 | Example 31 | 15 | Yes | Yes | 41 seconds. |
| 38 | Example 26 | 15 | Yes | Yes | 19 seconds. |
| 39 | Example 24 plus 10 drops of Example 23 | 14.6 / 10.7 | Yes | Yes | 30 seconds. |
| 40 | Example 25 | 9.5 | No | Yes | More than 24 hours. |
| 41 | Example 25 plus 10 drops of Example 24 | 9.5 / 14.6 | Yes | Yes | 120 seconds. |
| 42 | Example 24 plus 10 drops of 2,4-pentanedione | 14.6 | Yes | Yes | More than 24 hours. |
| 43 | Example 25 plus 10 drops of ethylenediamine | 9.5 | Yes | Yes | Do. |
| 44 | Example 29 [a] | 15 | Yes | Yes | 400 seconds. |
| 45 | Example 25 [a] | 9.5 | No | Yes | More than 24 hours. |
| 46 | Example 24 [a] | 14.6 | Yes | No | Do. |

[a] In Examples 44, 45 and 46, 5 gram portions of the polymer solutions of Examples 29, 25 and 24 respectively were treated with 5 drops of 30 percent aqueous glyoxal solution per portion.

Example 47

A photographic silver bromoiodide emulsion is prepared by the general procedure of Trivelli and Smith, Phot. Journal, 79, pages 330–331 (1939), using 8 grams of gelatin per mole of silver as a peptizing agent. The vehicle is composed of 200 grams of the copolymer of Example 26. The emulsion thus prepared is mixed with aqueous formaldehyde, amounting to 1 percent by weight of the polymeric vehicle, and immediately coated on cellulose acetate film base on a warm block. The emulsion coating insolubilizes within about 2 minutes to a gelatinous mass which is dried in about 5 minutes by means of forced warm air.

Example 48

Results similar to those obtained in Example 47 are secured when the vehicle is composed of a mixture of the polymers of Examples 23 and 24.

Example 49

A photographic silver bromoiodide emulsion is prepared in the manner of Example 47 except that 200 g. of the copolymer of Example 24 is substituted for the copolymer of Example 26. The emulsion is treated with formaldehyde as described in Example 47 and immediately coated on a cellulose acetate support. The coating requires a period of more than 24 hours for insolubilization to a gelatinous mass.

The copolymers employed in practicing this invention are excellent substitutes for gelatin in photographic applications since they not only show good resistance to abrasion and adhere well to film supports, but they also exhibit excellent dimensional stability and water permeability and to not cause undesirable photographic effects. Thus, the copolymers described herein are useful as replacements for all or part of the usual binding agents such as gelatin, for example, which are generally employed in photographic elements. For example, the novel copolymers of this invention can be used in photographic silver halide emulsion layers, stripping layers, backing layers, antiabrasion layers and the like. In addition, many of the copolymers exhibit excellent salt tolerance, i.e., they do not coagulate in the presence of organic or inorganic salts which are often present in photographic silver halide compositions.

Other primary amino group-containing polymers of this invention can be employed to advantage in the coagulation of silver halide suspensions peptized with polymers containing sulfonate or sulfate groups as described in co-filed U.S. patent application Ser. No. 60,701. Useful coagulating agents comprise homo- and copolymers prepared from the ω-primary amino group-containing monomers of this invention. Exemplary comonomers include acrylic acid, methacrylic acid and the like.

emulsions, as shown in U.S. patent application Ser. No. 17,879, filed Mar. 9, 1970 to Dorothy Johnson Beavers published Sept. 8, 1970 as Defensive Publication T878,010.

The invention has been described in detail with particular reference to certain preferred embodiments thereof, but it will be understood that variations and modifications can be effected within the spirit and scope of the invention.

What is claimed is:

1. A photographic silver halide composition comprising a polymeric compound containing the polymeric unit

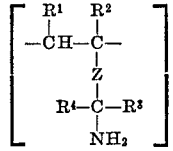

where $R^1$ is hydrogen or caboxyl; $R^2$ is hydrogen, methyl or ethyl; each of $R^3$ and $R^4$ is an alkyl group of 1 to 12 carbon atoms; and Z is a divalent group containing at least one

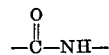

group and having the formula

where each of $n$ and $m$ is 0 or 1, and $n$ is 0 when $m$ is 1 and $m$ is 0 when $n$ is 1, and $R^5$ is a divalent organic material selected from the group consisting of alkylene of 1 to 20 carbon atoms, an azaoxoalkylene of 2 to 20 carbon atoms, cycloalkylene of 5 to 14 carbon atoms, and alkylenecarbamoylphenylene with the alkylene group containing 1 to 20 carbon atoms, and the acid addition salts thereof.

2. A photographic silver halide emulsion in which the binding agent comprises an interpolymer of (A) at least 50 percent by weight of a monomer having the formula

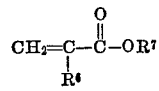

where $R^6$ is hydrogen, methyl or ethyl, and $R^7$ is alkyl of 1 to 12 carbon atoms, (B) between about 3 and about 30 percent by weight of acrylic acid or an ester monomer having the formula

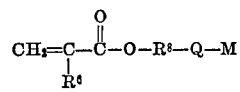

where $R^6$ is hydrogen or alkyl containing from 1 to 2 carbon atoms, $R^8$ has its valence bonds on different carbon atoms and is a member selected from the group consisting of a divalent hydrocarbon and a divalent hydrocarbon in which a chain of carbon atoms joining the oxygen and Q radicals in the above formula is interrupted by an oxygen or sulfur atom, Q is —OSO$_2$O—, or —SO$_2$O— and M is a cation, and (C) between about 2 of the formula

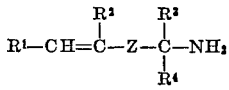

where R$^1$ is hydrogen or carboxyl; R$^2$ is hydrogen, methyl or ethyl; each of R$^3$ and R$^4$ is an alkyl group of 1 to 12 carbon atoms; and Z is a divalent group containing at least one

group and having the formula

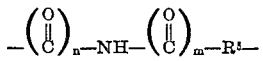

where each of $n$ and $m$ is 0 or 1, and $n$ is 0 when $m$ is 1 and $m$ is 0 when $n$ is 1, and R$^5$ is a divalent organic material selected from the group consisting of alkylene of 1 to 20 carbon atoms, and azaoxoalkylene of 2 to 20 carbon atoms, cycloalkylene of 5 to 14 carbon atoms, and alkylenecarbamoylphenylene with the alkylene group containing 1 to 20 carbon atoms, and the acid addition salts thereof.

3. A photographic silver halide emulsion in which the binding agent comprises a copolymer of the formula

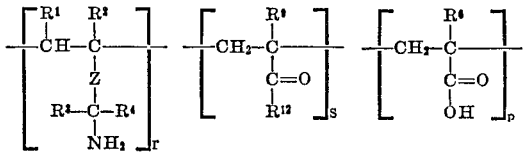

where R$^1$ is hydrogen or carboxyl; each of R$^2$ and R$^6$ is hydrogen, methyl or ethyl; each of R$^3$ and R$^4$ is an alkyl group of 1 to 12 carbon atoms; and Z is a divalent group containing at least one

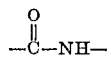

group and having the formula

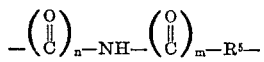

where each of $n$ and $m$ is 0 or 1, and $n$ is 0 when $m$ is 1 and $m$ is 0 when $n$ is 1, and R$^5$ is a divalent organic material selected from the group consisting of alkylene of 1 to 20 carbon atoms, an azaoxoalkylene of 2 to 20 carbon atoms, cycloalkylene of 5 to 14 carbon atoms, and alkylenecarbamoylphenylene with the alkylene group containing 1 to 20 carbon atoms; R$^9$ is hydrogen, methyl, ethyl, or an acyloxyalkyl group of the formula

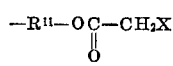

where R$^{11}$ is alkylene of 1 to 10 carbon atoms, X is aliphatic acyl of 1 to 10 carbon atoms or cyano, R$^{12}$ is amino, alkyl of 1 to 10 carbon atoms or acyloxyalkyl as defined in R$^9$, provided that no more than one and only one of R$^9$ and R$^{12}$ is an acyloxyalkyl group; $r$ represents about 5 to about 99 percent by weight of the total polymer, $s$ represents about 95 to about 1 percent by weight of the total polymer and $p$ represents 0 to about 36 percent by weight of the total polymer; provided that $r$ plus $s$ equals about 100 percent when $p$ is 0 and $r$ plus $s$ plus $p$ equals about 100 percent when $p$ is a positive value and, the acid addition salts thereof.

4. A photographic element comprising a support, a photographic silver halide layer and incorporated in at least one layer of said photographic element an interpolymer of (A) at least 50 percent by weight of a monomer having the formula

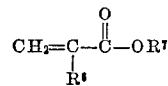

where R$^6$ is hydrogen, methyl, or ethyl, and R$^7$ is alkyl of 1 to 12 carbon atoms, (B) between about 3 and about 30 percent by weight of acrylic acid or an ester monomer having the formula

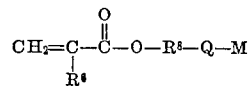

where R$^6$ is hydrogen, methyl or ethyl, and R$^8$ has its valence bonds on different carbon atoms and is a member selected from the group consisting of a divalent hydrocarbon and a divalent hydrocarbon in which a chain of carbon atoms joining the oxygen and Q radicals in the above formula is interrupted by an oxygen or sulfur atom, Q is —OSO$_2$O or —SO$_2$O and M is a cation, and (C) between about 2 and 20% by weight of a polymerizable monomer of the formula

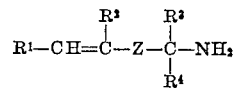

where R$^1$ is hydrogen or carboxyl; R$^2$ is hydrogen, methyl or ethyl; each of R$^3$ and R$^4$ is an alkyl group of 1 to 12 carbon atoms; and Z is a divalent group containing at least one

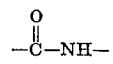

group and having the formula

where each of $n$ and $m$ is 0 or 1, and $n$ is 0 when $m$ is 1 and $m$ is 0 when $n$ is 1, and R$^5$ is a divalent organic material selected from the group consisting of alkylene of 1 to 20 carbon atoms, an azaoxoalkylene of 2 to 20 carbon atoms, cycloalkylene of 5 to 14 carbon atoms, and alkylenecarbamoylphenylene with the alkylene group containing 1 to 20 carbon atoms, and the acid addition salts thereof.

5. A photographic element comprising a support, a photographic silver halide layer and incorporated in at least one layer of said photographic element a copolymer of the formula

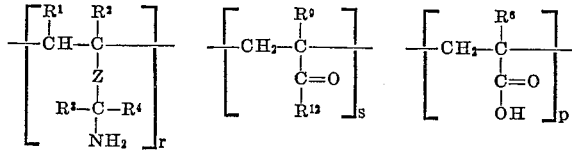

where R$^1$ is hydrogen or carboxyl; each of R$^2$ and R$^6$ is hydrogen, methyl or ethyl; each of R$^3$ and R$^4$ is an alkyl group of 1 to 12 carbon atoms; and Z is a divalent group containing at least one

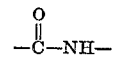

group and having the formula

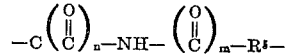

where each of $n$ and $m$ is 0 or 1, and $n$ is 0 when $m$ is 1 and $m$ is 0 when $n$ is 1, and R$^5$ is a divalent organic material selected from the group consisting of alkylene of 1 to 20 carbon atoms, an azaoxoalkylene of 2 to 20 carbon atoms, cycloalkylene of 5 to 14 carbon atoms, and alkylenecarbamoylphenylene with the alkylene group containing 1 to 20 carbon atoms; $R^9$ is hydrogen, methyl, ethyl, or an acyloxyalkyl group of the formula

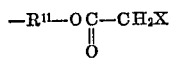

where $R^{11}$ is alkylene of 1 to 10 carbon atoms, X is aliphatic acyl of 1 to 10 carbon atoms or cyano, $R^{12}$ is amino, alkyl of 1 to 10 carbon atoms or acyloxyalkyl as defined in $R^9$, provided that no more than one and only one of $R^9$ and $R^{12}$ is an acyloxyalkyl group; $r$ represents about 5 to about 99 percent by weight of the total polymer, $s$ represents about 95 to about 1 percent by weight of the total polymer and $p$ represents 0 to about 36 percent by weight of the total polymer; provided that $r$ plus $s$ equals about 100 percent when $p$ is 0 and $r$ plus $s$ plus $p$ equals about 100 percent when $p$ is a positive value and, the acid addition salts thereof.

References Cited

UNITED STATES PATENTS

| 2,845,408 | 7/1958 | Melamed | 260—89.7 |
| 3,488,708 | 1/1970 | Smith | 96—84 |
| 3,411,911 | 11/1968 | Dykstra | 96—87 |
| 3,396,030 | 8/1968 | Haas | 96—114 |

OTHER REFERENCES

Beavers, D. J., Def. Publ. search copy of Ser. No. 17,879 filed Mar. 9, 1970.

RONALD H. SMITH, Primary Examiner

U.S. Cl. X.R.

96—76 R, 87 R, 87 A, 114; 260—80.5, 551